(12) United States Patent
Lee et al.

(10) Patent No.: US 12,135,475 B2
(45) Date of Patent: Nov. 5, 2024

(54) DISPLAY DEVICE AND DISPLAY SYSTEM COMPRISING OPTICAL INTERFACE

(71) Applicant: SAMSUNG DISPLAY CO., LTD., Yongin-si (KR)

(72) Inventors: Hee Young Lee, Yongin-si (KR); Da Som Gu, Yongin-si (KR); Ki Jun Roh, Yongin-si (KR); Gil Yeong Park, Yongin-si (KR); Sung Guk An, Yongin-si (KR); So Yeon Han, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/221,000

(22) Filed: Jul. 12, 2023

(65) Prior Publication Data

US 2024/0219761 A1  Jul. 4, 2024

(30) Foreign Application Priority Data

Dec. 29, 2022 (KR) .................. 10-2022-0189841

(51) Int. Cl.
| | | |
|---|---|---|
| *G02F 1/1333* | (2006.01) | |
| *G02F 1/1335* | (2006.01) | |
| *G02F 1/137* | (2006.01) | |
| *G06F 3/0354* | (2013.01) | |

(52) U.S. Cl.
CPC .... *G02F 1/13338* (2013.01); *G02F 1/133502* (2013.01); *G02F 1/133504* (2013.01); *G02F 1/133553* (2013.01); *G02F 1/13718* (2013.01); *G06F 3/03542* (2013.01); *G06F 2203/033* (2013.01)

(58) Field of Classification Search
CPC ........... G02F 1/13338; G02F 1/133502; G02F 1/133504; G02F 1/133553; G02F 1/13718; G06F 3/03542
USPC .......................................................... 349/12
See application file for complete search history.

(56) References Cited

U.S. PATENT DOCUMENTS

| | | | |
|---|---|---|---|
| 6,111,699 A | 8/2000 | Iwata et al. | |
| 10,088,701 B2 * | 10/2018 | Khan | ............ G06F 3/041 |
| 2008/0036926 A1 * | 2/2008 | Chen | ............ G02F 1/13338 |
| | | | 349/1 |
| 2015/0293614 A1 * | 10/2015 | Kwak | ............ G02F 1/0131 |
| | | | 349/12 |
| 2020/0225521 A1 | 7/2020 | Lee et al. | |

FOREIGN PATENT DOCUMENTS

| | | |
|---|---|---|
| JP | 4101339 | 6/2008 |
| JP | 6565236 | 8/2019 |
| KR | 10-2020-0088532 | 7/2020 |

* cited by examiner

*Primary Examiner* — Charles S Chang
(74) *Attorney, Agent, or Firm* — F. CHAU & ASSOCIATES, LLC

(57) ABSTRACT

A display device includes a display layer emitting light. An infrared reflective layer is disposed on the display layer. An optical pattern is disposed on the infrared reflective layer. The optical pattern absorbs at least a portion of infrared light.

20 Claims, 8 Drawing Sheets

DISPLAY DEVICE AND DISPLAY SYSTEM COMPRISING OPTICAL INTERFACE

CROSS-REFERENCE TO RELATED APPLICATION

This application claims priority under 35 U.S.C. § 119 to Korean Patent Application No. 10-2022-0189841, filed on Dec. 29, 2022 in the Korean Intellectual Property Office, the disclosure of which is incorporated by reference in its entirety herein.

1. TECHNICAL FIELD

Various embodiments of the present disclosure relate to a display device and a display system comprising an optical interface.

2. DISCUSSION OF RELATED ART

Display devices display images which provide a connection medium between a user and visual information. Display devices have become increasingly important and have been applied to numerous different electronic devices along with the development of information technology.

A display device may be configured to recognize a user input provided from a pen. The pen for display devices may comprise an optical pen or the like which uses optical information to provide the user input.

To increase the performance of recognizing information provided from the optical pen, there is a need to appropriately maintain optical information interacting between the optical pen and the display device.

SUMMARY

Various embodiments of the present disclosure are directed to a display device and a display system comprising an optical interface, which have increased performance of recognizing information provided from an optical pen.

According to an embodiment of the present disclosure, a display device includes a display layer emitting light. An infrared reflective layer is disposed on the display layer. An optical pattern is disposed on the infrared reflective layer. The optical pattern absorbs at least a portion of infrared light.

In an embodiment, the infrared reflective layer may comprise a cholesteric liquid crystal and has a thin-film structure.

In an embodiment, the infrared reflective layer may comprise a first cholesteric liquid crystal layer and a second cholesteric liquid crystal that respectively comprise cholesteric liquid crystals having helix structures defined in different directions from each other.

In an embodiment, the display device may further comprise an upper layer disposed between the display layer and the infrared reflective layer. The upper layer is a base and the infrared reflective layer is disposed on the base.

In an embodiment, the optical pattern may comprise organic material absorbing at least a portion of light in a wavelength band ranging from about 750 nm to about 950 nm.

In an embodiment, the optical pattern may be arranged in a dot pattern.

In an embodiment, the display device may further comprise a scattering layer comprising a scatterer including at least one of a light scattering particle and a light scattering material.

In an embodiment, the scattering layer may comprise an adhesive layer.

In an embodiment, the scattering layer may comprise an anti-glare (AG) coating layer.

In an embodiment, the optical pattern may be disposed between the scattering layer and the infrared reflective layer.

In an embodiment, the scattering layer may be disposed between the infrared reflective layer and the display layer.

In an embodiment, the display device may further comprise a film layer disposed on the optical pattern. An outer layer is disposed on the film layer. The film layer may comprise one or more films selected from a group comprising a polyethyleneterephthalate (PET) film, a polyimide (PI) film, a low-reflective film, a polarizing film, and a transmittance controllable film. The scattering layer may be disposed between the film layer and the outer layer.

In an embodiment, the scattering layer may comprise a first scattering layer and a second scattering layer that are disposed on different layers from each other. The first scattering layer may be disposed between the infrared reflective layer and the display layer. The second scattering layer may be disposed on the optical pattern.

In an embodiment, the display device may further comprise an upper layer disposed between the display layer and the optical pattern. The upper layer is a base and the optical pattern is disposed on the base. The infrared reflective layer may be disposed between the upper layer and the display layer.

In an embodiment, the display device may further comprise: a first base disposed between a first surface of the infrared reflective layer and the display layer. A second base is disposed on a second surface of the infrared reflective layer that is opposite to the first surface of the infrared reflective layer.

According to an embodiment of the present disclosure, a display system comprises an optical interface. The display system may include an optical pen outputting infrared light. A display device obtains information about user input based on the infrared light output from the optical pen. The display device may comprise a display layer emitting light; an infrared reflective layer disposed on the display layer and reflecting at least a portion of the infrared light output from the optical pen; and an optical pattern disposed on the infrared reflective layer and absorbing at least a portion of the infrared light output from the optical pen.

In an embodiment, the infrared light may comprise information about an input operation of a user. The display device may comprise a writing area having the optical pattern disposed therein.

In an embodiment, the infrared reflective layer may comprise a cholesteric liquid crystal.

In an embodiment, the infrared reflective layer may comprise a first cholesteric liquid crystal layer and a second cholesteric liquid crystal that respectively comprise cholesteric liquid crystals having helix structures defined in different directions from each other.

In an embodiment, the display device may further comprise a scattering layer comprising a scatterer including at least one of a light scattering particle and a light scattering material.

DETAILED DESCRIPTION OF EMBODIMENTS

Figure 1:
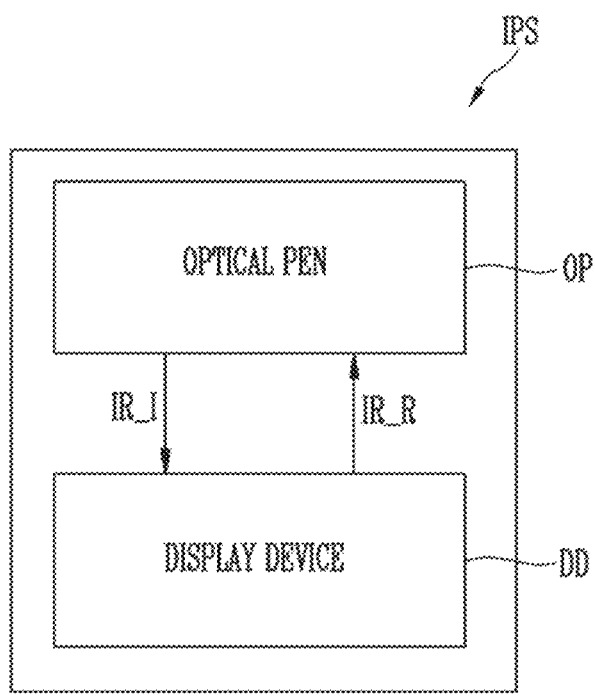
FIG. 1 is a schematic block diagram illustrating a display device comprising an optical input interface in accordance with an embodiment of the present disclosure.

As the present disclosure allows for various changes and numerous embodiments, non-limiting embodiments will be illustrated in the drawings and described in detail in the written description. However, embodiments of the present disclosure are not necessarily limited to the described embodiments. The description of embodiments is not intended to limit the present disclosure to particular modes of practice, and it is to be appreciated that all changes, equivalents, and substitutes that do not depart from the spirit and technical scope of the present disclosure are encompassed in the present disclosure.

It will be understood that, although the terms "first", "second", etc. may be used herein to describe various elements, these elements should not be limited by these terms. These terms are only used to distinguish one element from another element. For instance, a first element discussed below could be termed a second element without departing from embodiments of the present disclosure. Similarly, the second element could also be termed the first element. In the present disclosure, the singular forms are intended to comprise the plural forms as well, unless the context clearly indicates otherwise.

It will be further understood that the terms "comprise", "comprise", "have", etc. when used in the present disclosure, specify the presence of stated features, integers, steps, operations, elements, components, and/or combinations of them but do not preclude the presence or addition of one or more other features, integers, steps, operations, elements, components, and/or combinations thereof. Furthermore, in case that a first part such as a layer, a film, a region, or a plate is disposed on a second part, the first part may be not only directly on the second part but a third part may intervene between them. In addition, when it is expressed that a first part such as a layer, a film, a region, or a plate is formed on a second part, the surface of the second part on which the first part is formed is not necessarily limited to an upper surface of the second part but may comprise other surfaces such as a side surface or a lower surface of the second part. In a case in which a first part such as a layer, a film, a region, or a plate is under a second part, the first part may be not only directly under the second part but a third part may intervene between them.

Various embodiments of the present disclosure relate to a display device and a display system comprising an optical interface. Hereinafter, a display device and a display system comprising an optical interface in accordance with an embodiment will be described with reference to the attached drawings.

Figure 2:
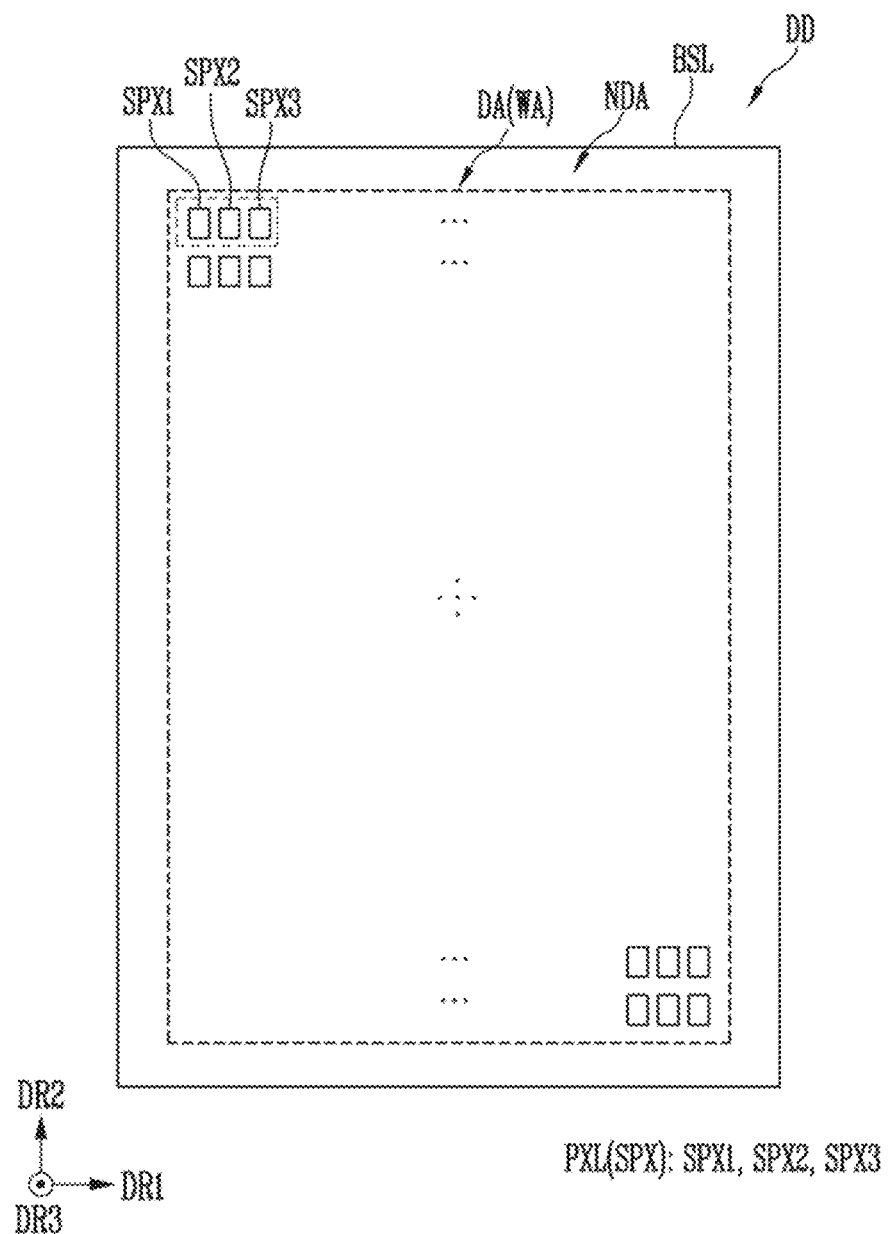
FIG. 2 is a schematic plan view illustrating a display device in accordance with an embodiment of the present disclosure.

FIG. 1 is a schematic block diagram illustrating a display device DD comprising an optical input interface in accordance with an embodiment. FIG. 2 is a schematic plan view illustrating a display device in accordance with an embodiment.

Referring to FIGS. 1 and 2, a display system IPS in accordance with an embodiment may comprise an optical input interface. The display system IPS may comprise a system in which the display device DD obtains information about a user input based on optical information provided from an optical pen OP.

In an embodiment, the display system IPS may comprise the optical pen OP and the display device DD. The optical pen OP and the display device DD may interact with each other.

The user may use the optical pen OP to input various kinds of information, such as a text, an image, and the like, to a writing area WA of the display device DD. However, embodiments of the present disclosure are not necessarily limited thereto.

The optical pen OP may output light. In an embodiment, the optical pen OP may output first infrared light IR_I comprising information about the user input. For example, the user may perform an operation of inputting a test, an image, or the like to the writing area WA of the display device DD. The first infrared light IR_I may be applied to some locations in the writing area WA according to the operation performed by the user. In an embodiment, the first infrared light IR_I may comprise information about an input operation of the user.

The optical pen OP may receive light provided (e.g., reflected) from the display device DD. For example, the optical pen OP may receive second infrared light IR_R comprising information about the user input.

In an embodiment, the infrared light, such as the first infrared light IR_I and the second infrared light IR_R, may be light having a wavelength band of about 750 nm. In some embodiments, the infrared light, such as the first infrared light IR_I and the second infrared light IR_R, may be light having a wavelength in a range of about 750 nm to about 950 nm. In some embodiments, a peak wavelength of the infrared light, such as the first infrared light IR_I and the second infrared light IR_R, may be in a range of about 750 nm to about 950 nm.

For example, in an embodiment the first infrared light IR_I outputted from the optical pen OP may be selectively reflected depending on the location by an optical pattern OPP (FIG. 3) comprised in the display device DD. The second infrared light IR_R reflected may be generated differently depending on the location of the user input. The optical pen OP may recognize the second infrared light IR_R and thus obtain information about the input location on the writing area WA.

Hence, based on the information about the input location on the writing area WA, information about the user input may be calculated. In an embodiment, the display device DD may obtain (e.g., calculate) information about the user input. In an embodiment, the optical pen OP may obtain (e.g., calculate) information about the user input.

In an embodiment, the optical pen OP may further comprise a controller and a communicator. In an embodiment, the controller may be implemented as a CPU or a device similar thereto depending on hardware, software, or a combination thereof. The communicator may network with the display device DD. For example, the communicator may be a Bluetooth transceiver. However, embodiments of the present disclosure are not necessarily limited thereto.

Figure 3:
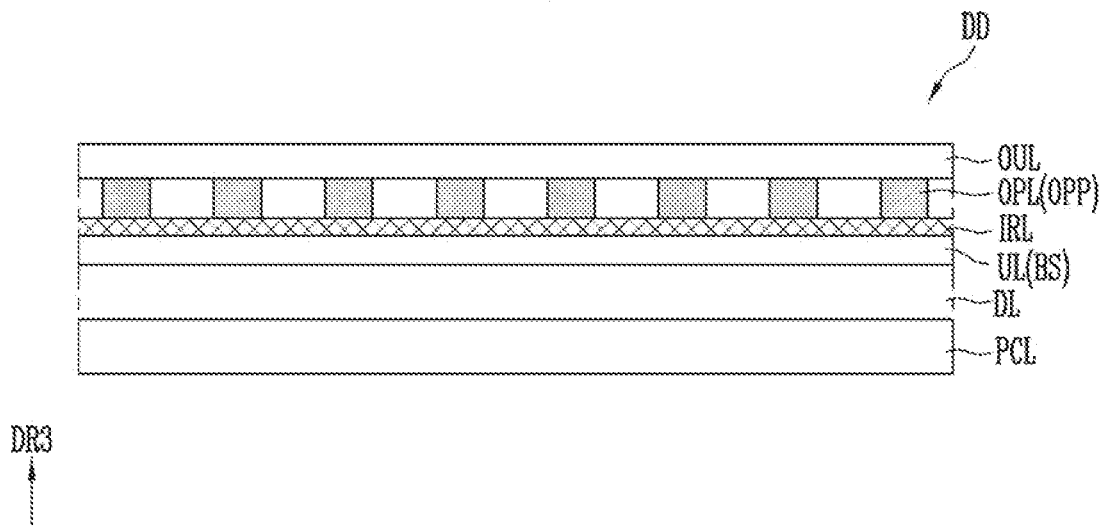
FIGS. 3 to 11 are schematic cross-sectional views each illustrating a display device in accordance with embodiments of the present disclosure.

The display device DD may emit light. The display device DD may comprise a display layer DL (FIG. 3).

In an embodiment, the display device DD may comprise a base layer BSL, and pixels PXL disposed on the base layer BSL. The display device DD may further comprise a driving circuit component (e.g., a scan driver and a data driver), lines, and pads which are provided to drive the pixels PXL.

The display device DD may comprise a display area DA and a non-display area NDA. The non-display area NDA may be an area other than the display area DA in which an image is not displayed. In an embodiment, the non-display area NDA may enclose at least a portion of the display area DA (e.g., in the first direction DR1 and/or second direction DR2). The display device DD may further comprise the writing area WA. In an embodiment, the writing area WA may overlap at least a portion of the display area DA. In an embodiment, the non-display area NDA may enclose at least a portion of the writing area WA (e.g., in the first direction DR1 and/or second direction DR2).

The base layer BSL may form a base of the display device DD. In an embodiment, the base layer BSL may be a rigid or flexible substrate or film. For example, the base layer BSL may be a rigid substrate made of glass or reinforced glass, a flexible substrate (e.g., a thin film) formed of plastic or metal, or at least one insulating layer. However, embodiments of the present disclosure are not necessarily limited thereto and the material and/or properties of the base layer BSL may vary. In an embodiment, the base layer BSL may be substantially transparent. Here, the words "substantially transparent" may mean that light can pass through the base layer BSL with a transmittance of a certain value or more. In an embodiment, the base layer BSL may be translucent or opaque. Furthermore, in an embodiment the base layer BSL may comprise reflective material.

The display area DA may refer to an area in which the pixels PXL are disposed and images are displayed. The non-display area NDA may refer to an area in which the pixels PXL are not disposed and images are not displayed. The driving circuit layer, the lines, and the pads which are connected to the pixels PXL of the display area DA may be disposed in the non-display area NDA.

The writing area WA may be an area which may receive the first infrared light IR_I provided from the optical pen OP. For example, the writing area WA may be an area in which the optical pattern OPP is disposed.

Description of the optical pattern OPP that is configured to interact with the optical pen OP will be made below.

The display area DA may overlap at least the writing area WA, in a plan view. For example, in an embodiment the display area DA and the writing area WA may fully overlap each other, in a plan view. In an embodiment, the display area DA and the writing area WA may partially overlap each other, in a plan view.

The pixels PXL may include a plurality of sub-pixels SPX. In an embodiment, the pixels PXL (e.g., sub-pixels SPX) may be arranged according to a stripe or PENTILE™ arrangement structure. However, embodiments of the present disclosure are not necessarily limited thereto.

In an embodiment, each pixel PXL may comprise a light emitting element LD. In an embodiment, the pixel PXL may include sub-pixels SPX comprising a first sub-pixel SPX1, a second sub-pixel SPX2, and a third sub-pixel SPX3. However, embodiments of the present disclosure are not necessarily limited thereto and the number of sub-pixels may vary. At least one first sub-pixel SPX1, at least one second sub-pixel SPX2, and at least one third sub-pixel SPX3 may form one pixel unit which may emit various colors of light.

For example, each of the first sub-pixel SPX1, the second sub-pixel SPX2, and the third sub-pixel SPX3 may emit a different color of light from each other. For instance, in an embodiment the first sub-pixel SPX1 may be a red pixel configured to emit red (e.g., first color) light, the second sub-pixel SPX2 may be a green pixel configured to emit green (e.g., second color) light, and the third sub-pixel SPX3 may be a blue pixel configured to emit blue (e.g., third color) light. However, embodiments of the present disclosure are not necessarily limited thereto and the color, type, and/or number of the first sub-pixel SPX1, the second sub-pixel SPX2, and the third sub-pixel SPX3 may vary.

Hereinafter, the structure of a display device DD comprising an optical pattern OPP and an infrared reflective layer IRL in accordance with an embodiment will be described with reference to FIGS. 3 to 14. Description overlapping that of the embodiments described above will be simplified, or may not be repeated for economy of description.

First, a cross-sectional structure of the display device DD in accordance with an embodiment will be described with reference to FIGS. 3 to 11. FIGS. 3 to 11 are schematic cross-sectional views each illustrating a display device in accordance with an embodiment.

A display device DD in accordance with an embodiment will be described with reference to FIGS. 3 and 4.

Figure 4:
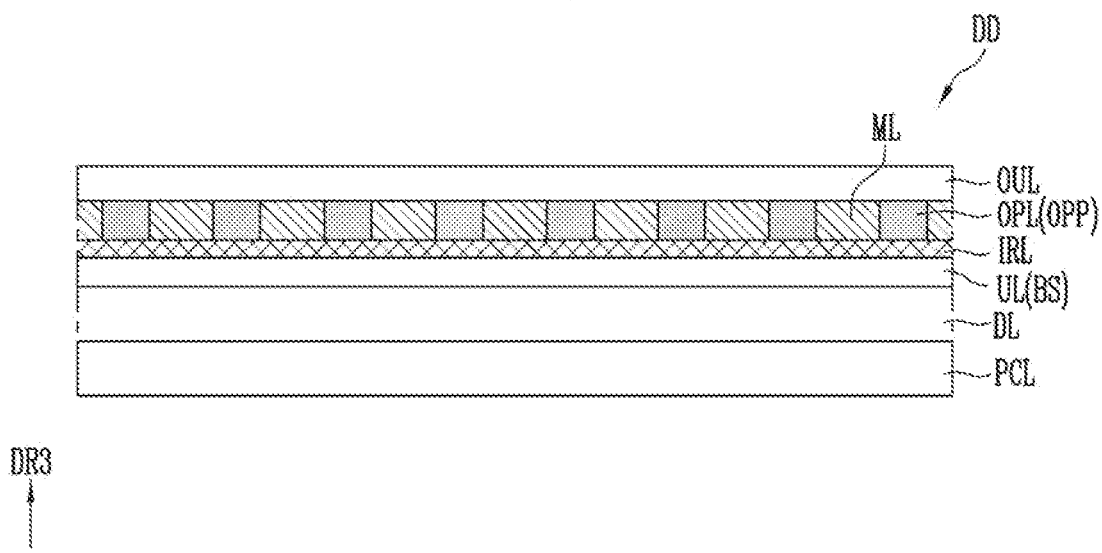

Referring to FIGS. 3 and 4, the display device DD may comprise a pixel circuit layer PCL, a display layer DL, an upper layer UL, an infrared reflective layer IRL, an optical layer OPL, and an outer layer OUL. In an embodiment, the display device DD may further comprise an intermediate layer ML.

The pixel circuit layer PCL may be a layer comprising a pixel circuit PXC configured to drive a pixel PXL (e.g., a sub-pixel SPX). The pixel circuit layer PCL may comprise a base layer BSL, conductive layers that form pixel circuits, and insulating layers disposed between the conductive layers. In an embodiment, the pixel circuit PXC may comprise a thin film transistor, and may be electrically connected with the pixel PXL (e.g., the sub-pixel SPX) to apply a driving signal to the pixel PXL (e.g., the sub-pixel SPX).

The display layer DL may be disposed on the pixel circuit layer PCL. The display layer DL may emit light. In an embodiment, the display layer DL may be provided in various shapes. For example, in an embodiment, the display layer DL may comprise an inorganic light emitting element comprising inorganic material. In an embodiment, the display layer DL may comprise an organic light emitting diode (OLED). However, embodiments of the present disclosure are not necessarily limited thereto.

The upper layer UL may be disposed on the display layer DL. In an embodiment, the upper layer UL may be a base BS which may form an area where the infrared reflective layer IRL is disposed. The upper layer UL may be disposed between the display layer DL and the infrared reflective layer IRL (e.g., in the third direction DR3). In an embodiment, the upper layer UL may be a film layer. For example, the upper layer UL may comprise one or more films selected from the group consisting of a polyethyleneterephthalate (PET) film, a polyimide (PI) film, a low-reflective film, a polarizing film, and a transmittance controllable film. In an embodiment, the upper layer UL may comprise a polarizing layer, or may not comprise a polarizing layer. In an embodiment, the upper layer UL may be an overcoat layer.

The infrared reflective layer IRL may be disposed on the upper layer UL (e.g., disposed directly thereon in the third direction DR3). In an embodiment, the infrared reflective layer IRL may directly contact the upper layer UL. The infrared reflective layer IRL may form an area where the optical pattern OPP is disposed. In an embodiment, the infrared reflective layer IRL may directly contact the optical pattern OPP.

The infrared reflective layer IRL may be disposed more outside than the display layer DL in a display direction of the display device DD (e.g., a third direction DR3 as a thickness direction of the base layer BSL), and may be disposed more inside than the optical pattern layer OPL. For example, in an embodiment in which the display surface is formed as an upper surface of the display device DD, the infrared reflective layer IRL may be disposed above the display layer DL and may be disposed below the optical pattern layer OPL.

The infrared reflective layer IRL may be disposed in the writing area WA of the display device DD. The infrared reflective layer IRL may have a film structure. For example, in an embodiment the infrared reflective layer IRL may have a thin-film structure. For example, the infrared reflective layer IRL may have an overall flat structure, and may generally cover a relatively large area.

In an embodiment, the infrared reflective layer IRL may cover the overall surface of at least a portion of the writing area WA. For example, in an embodiment the infrared reflective layer IRL may be disposed in the entirety of the writing area WA.

The infrared reflective layer IRL may reflect at least some light in the infrared wavelength band. The infrared reflective layer IRL may reflect at least a portion of the first infrared light IR_I applied from the optical pen OP. In an embodiment, the reflected light may be comprised in the second infrared light IR_R.

The infrared reflective layer IRL may reflect infrared light, and may increase the quantity of light, such as the second infrared light IR_R, to be provided to the optical pen OP. Therefore, the infrared reflective layer IRL may increase recognition performance for the optical pen OP.

In an embodiment, the infrared reflective layer IRL may comprise a cholesteric liquid crystal. For example, the infrared reflective layer IRL may comprise a cholesteric liquid crystal layer CLC (FIG. 13) comprising a cholesteric liquid crystal. In an embodiment, the infrared reflective layer IRL comprising a cholesteric liquid crystal may have a thin-film structure.

The infrared reflective layer IRL may be implemented as the cholesteric liquid crystal layer CLC, and may selectively reflect light of a desired wavelength band. Detailed description of the foregoing will be made below with reference to FIGS. 13 and 14.

The optical pattern layer OPL may be disposed on the infrared reflective layer IRL (e.g., directly thereon in the third direction DR3). The optical pattern layer OPL may comprise the optical pattern OPP. The optical pattern layer OPL may be disposed between the outer layer OUL and the infrared reflective layer IRL (e.g., in the third direction DR3).

In an embodiment, the optical pattern OPP may be arranged in a dot pattern. A plurality of optical patterns OPP may be provided, and may be patterned in various different arrangements.

The optical pattern OPP may absorb at least a portion of infrared light. The optical pattern OPP may absorb at least a portion of the first infrared light IR_I applied from the optical pen OP.

Since the optical pattern OPP absorbs at least a portion of the first infrared light IR_I, the intensity of the second infrared light IR_R in the area where the optical pattern OPP is disposed may be less than the intensity of the second infrared light IR_R in an area where the optical pattern OPP is not disposed. Based on optical information for each location, information about data provided from the optical pen OP to the writing area WA may be obtained. Based on the obtained information, input information from the user may be obtained.

The optical pattern OPP may comprise material capable of absorbing light in the infrared wavelength band. In an embodiment, the optical pattern OPP may comprise various organic materials capable of absorbing light in a wavelength band in a range of about 750 nm to about 950 nm (e.g., at least some light in the wavelength band ranging from about 750 nm to about 950 nm). However, embodiments of the present disclosure are not necessarily limited thereto.

In an embodiment as shown in FIG. 3, the display device DD may not include an intermediate layer ML. For example, a separate structure may not be disposed between a plurality of optical patterns, such as a first optical pattern and a second optical pattern. However, embodiments of the present disclosure are not necessarily limited thereto. For example, in an embodiment as shown in FIG. 4, the intermediate layer ML may be disposed between a plurality of optical patterns OPP adjacent to each other. For example, in an embodiment the optical patterns OPP may comprise the first optical pattern and the second optical pattern adjacent to each other. The intermediate layer ML may be disposed between the first optical pattern and the second optical pattern. In an embodiment, the intermediate layer ML may be a protective layer for protecting the optical pattern OPP, or may be a reflectivity matching layer having an appropriately defined refractive index.

The outer layer OUL may be disposed on the optical pattern layer OPL. In an embodiment, the outer layer OUL may comprise a window. The window may be a protective component disposed in the perimeter of the display device DD, and may be a substantially transparent light-transmissive component. The window may have a multilayer structure comprising at least one selected from the group consisting of a glass substrate, a plastic film, and a plastic substrate. The window may comprise a rigid or flexible substrate. However, embodiments of the present disclosure are not necessarily limited thereto and the material for forming the window may vary. In an embodiment, the outer layer OUL may further comprise a shock absorption film.

Figure 5:
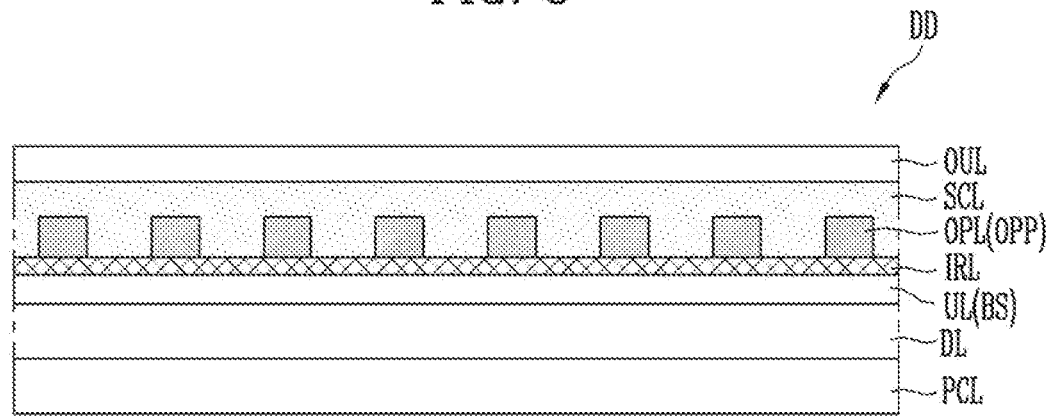
Figure 6:
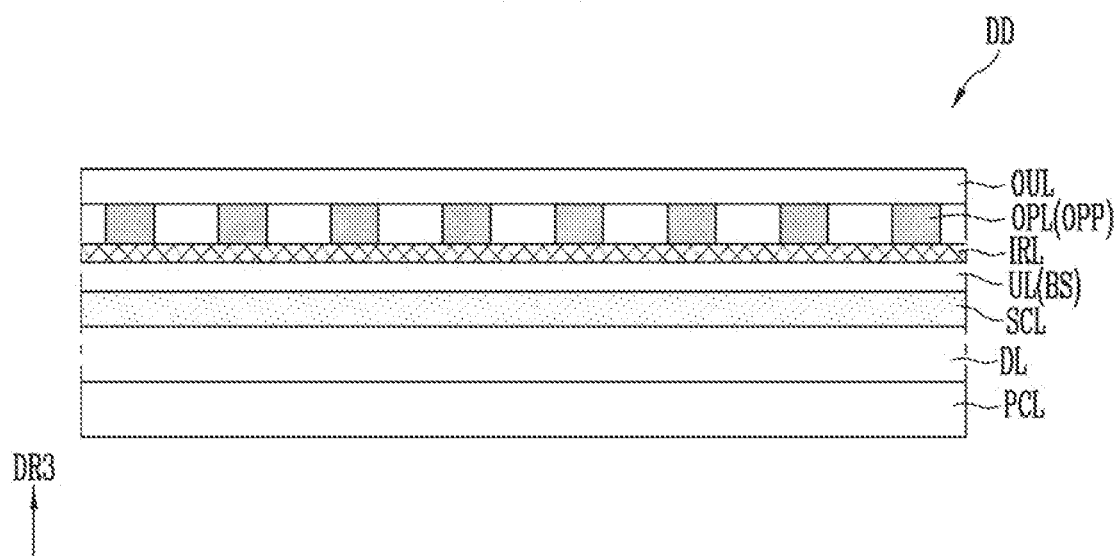

A display device DD in accordance with an embodiment will be described with reference to FIGS. 5 and 6. FIGS. 5 and 6 illustrate the display device DD in accordance with an embodiment.

The display device DD in accordance with an embodiment shown in FIGS. 5 and 6 is different from the display device DD in accordance with an embodiment shown in FIG. 3 in that the display device DD further comprises a single scattering layer SCL.

In an embodiment, the display device DD may further comprise a scattering layer SCL disposed on the optical pattern OPP and surrounding the optical pattern OP. The scattering layer SCL may comprise scatterers. As the scattering layer SCL includes scatterers, the recognition performance of the optical pen OP at various angles can be increased. Consequently, the degree of freedom in recognition angle during the operation of the optical pen OP can be increased.

The scatterers may comprise various light scattering particles and/or light scattering materials. For example, in an embodiment the scatterers may comprise one or more materials selected from the group consisting of silica ($SiO_x$) (e.g., silica beads, hollow silica particles, or the like), titanium oxide ($TiO_x$), zirconium oxide ($ZrO_x$), aluminum oxide ($Al_xO_y$), indium oxide ($In_xO_y$), zinc oxide ($ZnO_x$), tin oxide ($SnO_x$), and antimony oxide ($Sb_xO_y$). However, embodiments of the present disclosure are not necessarily limited thereto.

In an embodiment, an inner haze value of the scattering layer SCL may be about 1% or more. Since the inner haze of the scattering layer SCL has the foregoing inner haze value, the recognition performance of the optical pen OP can be increased. The inner haze may be a haze based on inner scattering of the scattering layer SCL. In an embodiment in which the scattering layer SCL comprises silica beads, the inner haze value of the scattering layer SCL may be adjusted by varying the size of each silica bead and the content of silica beads.

The scattering layer SCL may have a structure in which scatterers are distributed in a functional layer. For example, the scatterers may have a refractive index different from material for forming the functional layer.

For example, the scattering layer SCL may comprise an adhesive layer comprising scatterers. In an embodiment, the scattering layer SCL may function as an adhesive layer so that the optical pattern layer OPL and the outer layer OUL adhere to each other. Alternatively, the scattering layer SCL may function as an adhesive layer so that the upper layer UL and an upper surface of the display layer DL adhere to each other.

For example, the scattering layer SCL may comprise an anti-glare (AG) coating layer comprising scatterers. In an embodiment in which the scattering layer SCL is an AG coating layer, the thickness of the scattering layer SCL may be about 10 µm or less, and may comprise organic material or inorganic material.

The scattering layer SCL may be disposed on the optical pattern OPP (refer to FIG. 5). For example, the scattering layer SCL may directly contact the optical pattern OPP, such as an upper surface and lateral sides of the optical pattern OPP. The scattering layer SCL may be disposed between the optical pattern OPP and the outer layer OUL (e.g., in the third direction DR3).

In an embodiment as shown in FIG. 6, the scattering layer SCL may be disposed under the infrared reflective layer IRL (e.g., in the third direction DR3). For example, the scattering layer SCL may be disposed between the upper layer UL (e.g., the infrared reflective layer IRL) and the display layer DL (e.g., in the third direction DR3). In an embodiment, the scattering layer SCL may be disposed between the infrared reflective layer IRL and the display layer DL. The scattering layer SCL may directly contact the upper layer UL.

A display device DD in accordance with an embodiment will be described with reference to FIG. 7.

Figure 7:
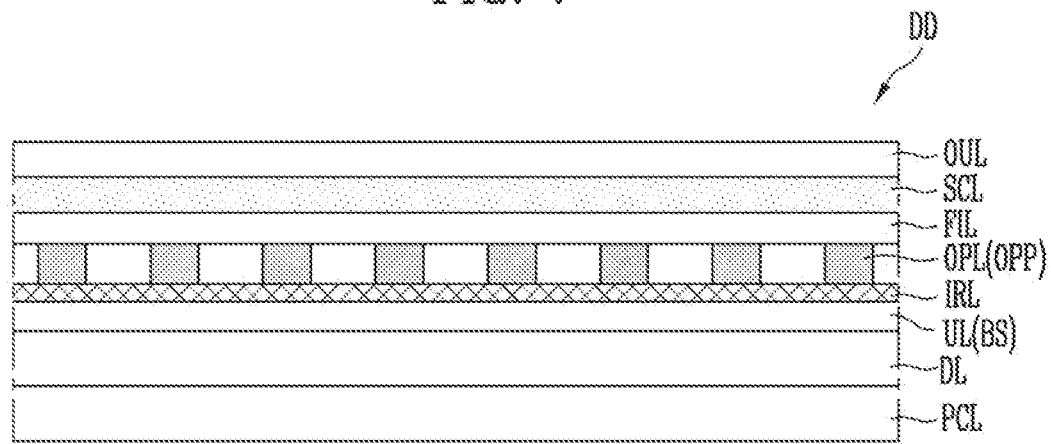

The display device DD in accordance with an embodiment shown in FIG. 7 is different from the display devices DD shown in embodiments of FIGS. 3-6 in that the display device DD comprises a scattering layer SCL disposed on a film layer FIL.

The display device DD in accordance with an embodiment as shown in FIG. 7 may comprise a film layer FIL and a scattering layer SCL. The scattering layer SCL may comprise scatterers. The film layer FIL may comprise one or more of the examples described above with referent to the upper layer UL. The film layer FIL may be disposed on the optical pattern OPP (e.g., disposed directly thereon in the third direction DR3).

The scattering layer SCL may be disposed on the film layer FIL (e.g., disposed directly thereon in the third direction DR3). For example, the scattering layer SCL may be disposed on the film layer FIL which is disposed on the optical pattern layer OPL. The scattering layer SCL may be disposed between the film layer FIL and the outer layer OUL (e.g., in the third direction DR3). In an embodiment, a first surface of the scattering layer SCL (e.g., a lower surface) may directly contact the film layer FIL, and the opposite second surface (e.g., an upper surface) of the scattering layer SCL may directly contact the outer layer OUL. In an embodiment, the optical pattern OPP is disposed between the scattering layer SCL and the infrared reflective layer IRL.

A display device DD in accordance with an embodiment will be described with reference to FIG. 8.

Figure 8:
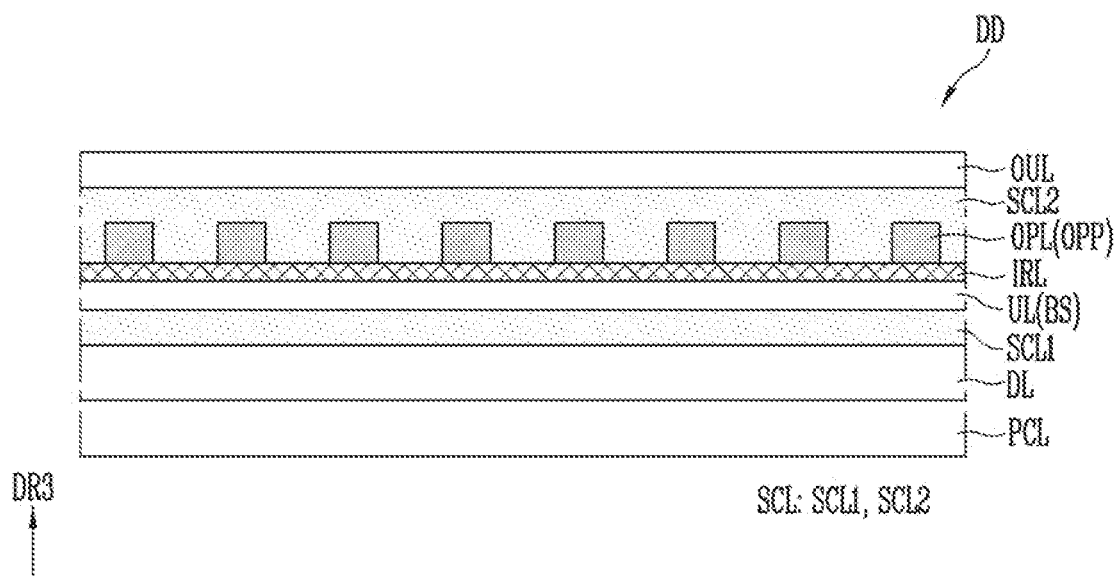

The display device DD in accordance with an embodiment shown in FIG. 8 is different from the display devices DD in accordance with embodiments shown in FIGS. 3-7 in that the display device DD comprises a plurality of scattering layers SCL.

For example, in an embodiment the scattering layers SCL may comprise a first scattering layer SCL1 and a second scattering layer SCL2 which are disposed in different layers from each other.

The first scattering layer SCL1 may be disposed under the infrared reflective layer IRL. The first scattering layer SCL1 may be disposed between the infrared reflective layer IRL and the display layer DL (e.g., in the third direction DR3). For example, in an embodiment the first scattering layer SCL1 may be disposed directly between the upper layer UL and the display layer DL (e.g., in the third direction DR3).

The second scattering layer SCL2 may be disposed over the infrared reflective layer IRL. For example, the second scattering layer SCL2 may be disposed on the optical pattern OPP disposed over the infrared reflective layer IRL. For example, the second scattering layer SCL2 may directly contact an upper surface and lateral sides of the optical pattern OPP.

In an embodiment, the scattering layers SCL may be respectively disposed at upper and lower sides of the infrared reflective layer IRL (e.g., in the third direction DR3), so that the recognition performance for the optical pen OP that provides light to the display device DD can be increased.

A display device DD in accordance with an embodiment will be described with reference to FIG. 9.

Figure 9:
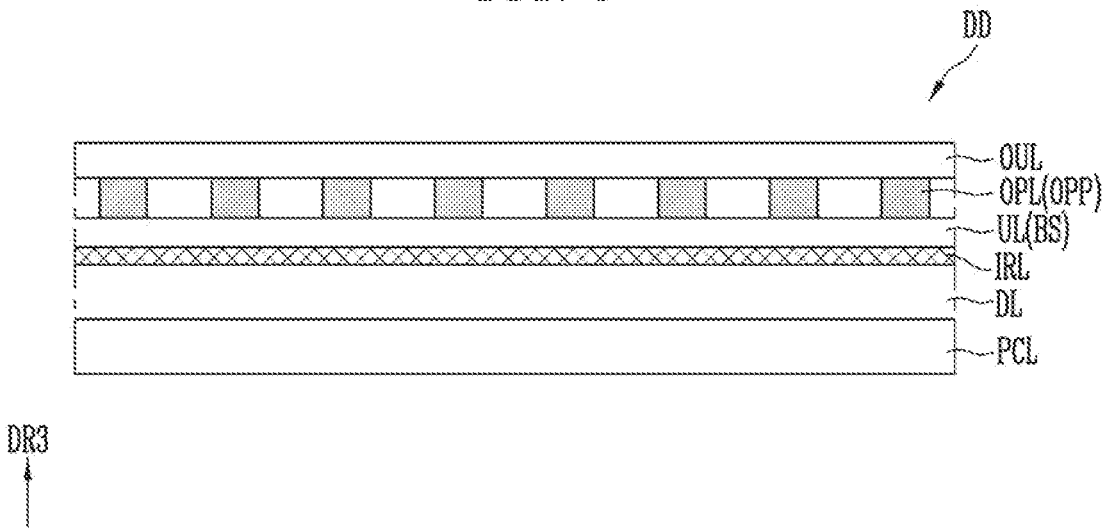

The display device DD in accordance with an embodiment shown in FIG. 9 is different from the display devices DD in accordance with embodiments shown in FIGS. 3-8 in that the infrared reflective layer IRL is disposed under the upper layer UL (e.g., in the third direction DR3).

In an embodiment as shown in FIG. 9, the infrared reflective layer IRL may be disposed under the base BS (e.g., the upper layer UL) provided to dispose the optical pattern OPP thereon. For example, the infrared reflective layer IRL may be disposed directly between the upper layer UL and the display layer DL (e.g., in the third direction DR3).

In an embodiment, since the infrared reflective layer IRL is disposed under the base BS, the optical pattern layer OPL may be fabricated after the infrared reflective layer IRL has been fabricated, during a process of fabricating a panel comprising the display layer DL. Consequently, the processing convenience may be increased.

A display device DD in accordance with embodiments will be described with reference to FIGS. 10 and 11.

Figure 10:
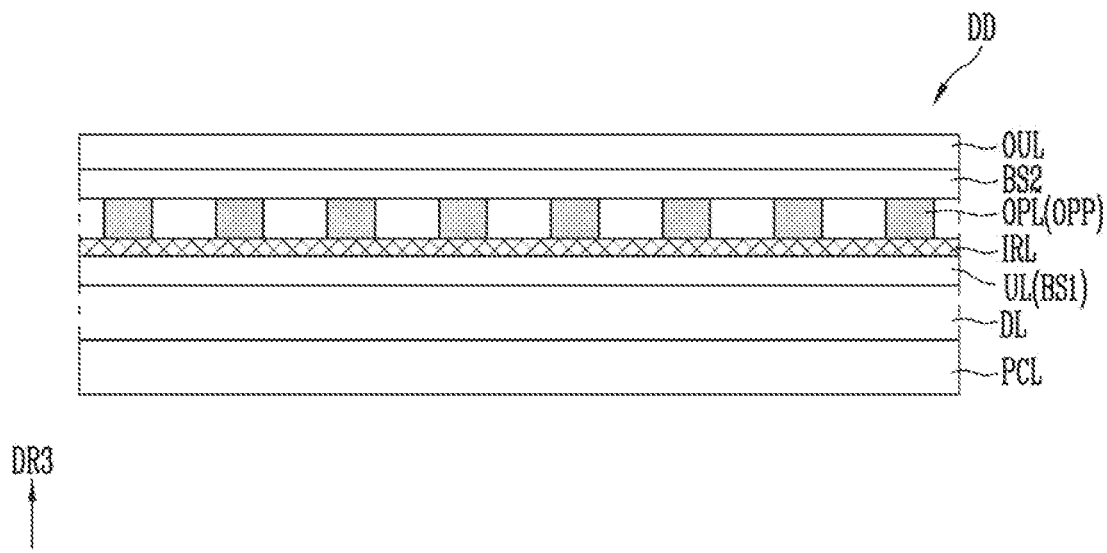
Figure 11:
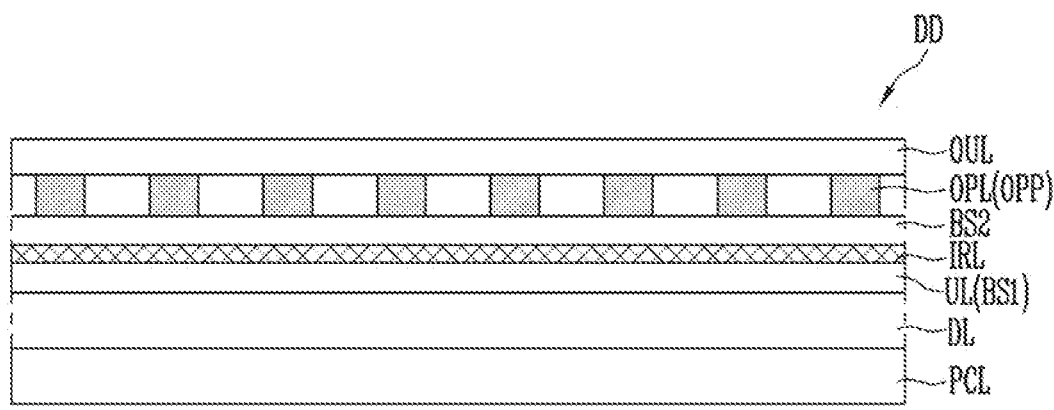

The display device DD in accordance with embodiments shown in FIGS. 10-11 are different from the display devices DD in embodiments shown in FIGS. 3-9 in that the display device DD comprises a first base BS1 and a second base BS2.

In an embodiment, the first base BS1 may form a base allowing the infrared reflective layer IRL to be disposed thereon. In an embodiment, the first base BS1 may be disposed directly between the infrared reflective layer IRL (e.g., a first surface of the infrared reflective layer IRL, such as a bottom surface) and the display layer DL (e.g., in the third direction DR3). The first base BS1 may be the upper layer UL.

In an embodiment, the second base BS2 may form a base allowing the optical pattern OPP to be disposed thereon. For example, the second base BS2 may be disposed over the second surface of the infrared reflective layer IRL that is opposite to the first surface of the infrared reflective layer IRL (e.g., a top surface). In an embodiment as shown in FIG. 10, the second base BS2 may be disposed directly between the optical pattern layer OPL and the outer layer OUL (e.g., in the third direction DR3). In an embodiment as shown in FIG. 11, the second base BS2 may be disposed directly between the optical pattern layer OPL and the infrared reflective layer IRL (e.g., in the third direction DR3).

In an embodiment, the first base BS1 and the second base BS2 may be separately provided. In an embodiment, the display device DD may be fabricated in such a way that the optical pattern layer OPL and the infrared reflective layer IRL are separately provided and then subsequently coupled to each other.

Figure 12:
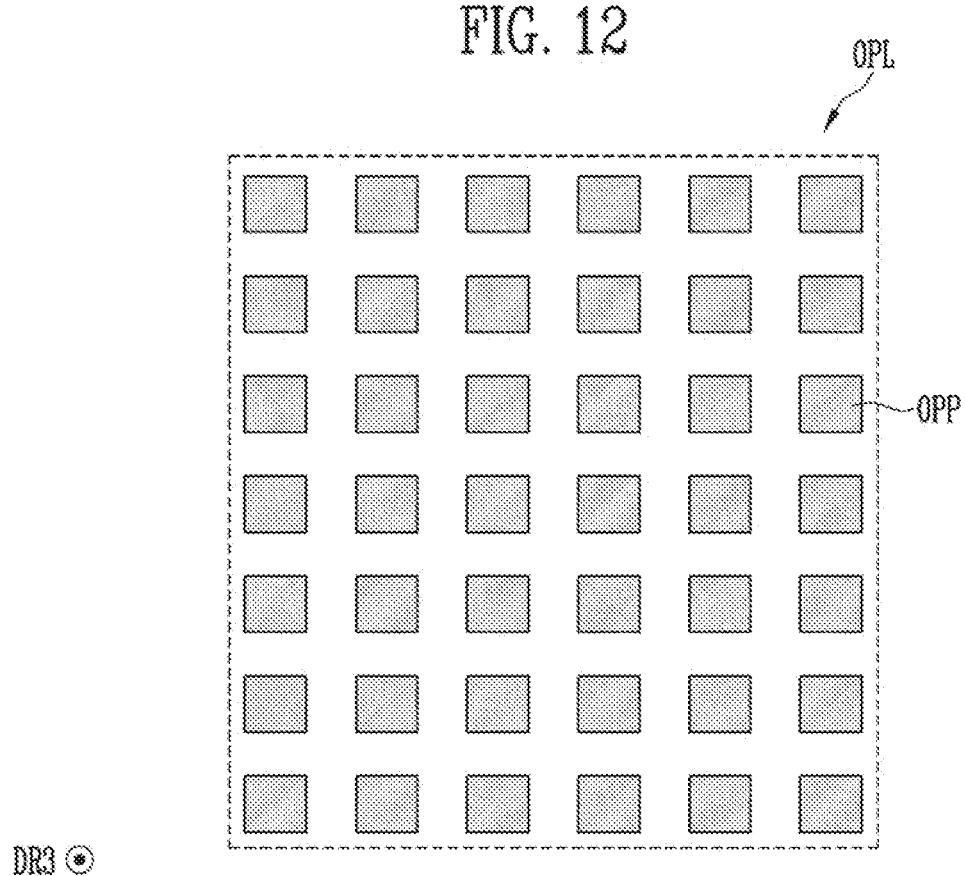
FIG. 12 is a schematic plan view illustrating an optical pattern layer in accordance with an embodiment of the present disclosure.

Next, a planar structure of the optical pattern layer OPL in accordance with an embodiment will be described with reference to FIG. 12. FIG. 12 is a schematic plan view illustrating the optical pattern layer OPL in accordance with an embodiment.

Referring to FIG. 12, the optical pattern layer OPL may comprise an optical pattern OPP patterned in various arrangements, in a plan view.

In an embodiment, the optical pattern OPP may be arranged in a dot pattern. For example, the optical pattern OPP may have a matrix structure according to a row direction and a column direction.

The optical pattern OPP may have various shapes, in a plan view. For example, in an embodiment the optical pattern OPP may have a n-polygonal shape in which n is an integer of 3 or more. In an embodiment, the optical pattern OPP may have a circular shape or an elliptical shape. However, embodiments of the present disclosure are not necessarily limited thereto.

Next, the structure of the infrared reflective layer IRL in accordance with some embodiments will be described with reference to FIGS. 13 and 14. Description overlapping that of embodiments described above will be simplified, or may not be repeated for economy of description.

Figure 13:
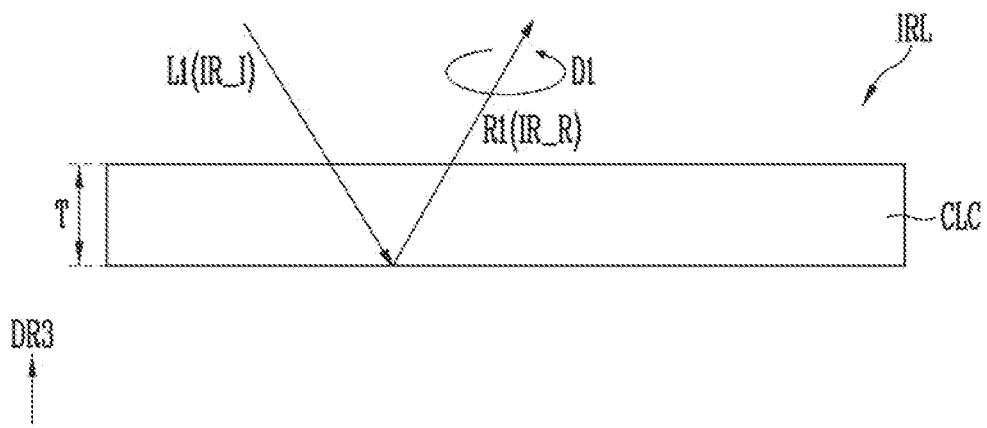
FIGS. 13 and 14 are schematic cross-sectional views illustrating an infrared reflective layer in accordance with embodiments of the present disclosure.
Figure 14:
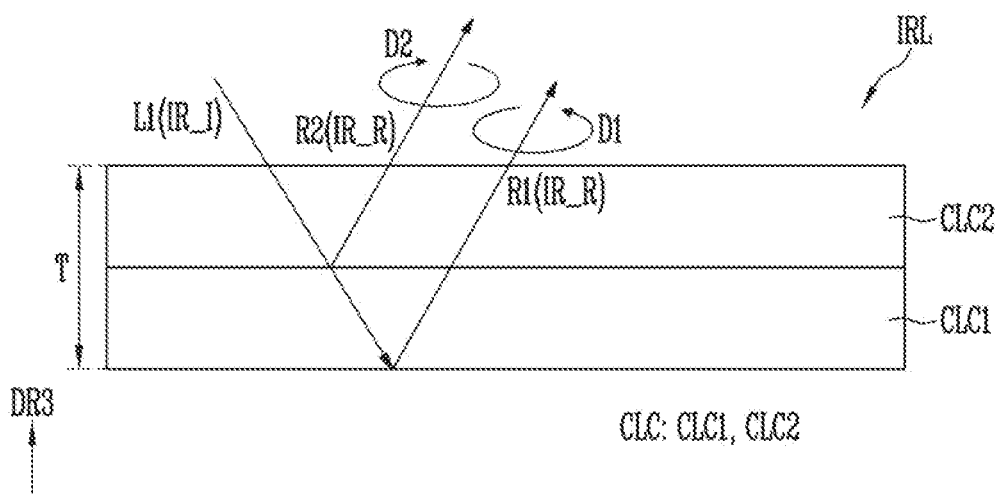

FIGS. 13 and 14 are schematic cross-sectional views illustrating the infrared reflective layer IRL in accordance with some embodiments. FIG. 13 illustrates an embodiment in which the infrared reflective layer IRL comprises a single cholesteric liquid crystal layer CLC. FIG. 14 illustrates an embodiment in which the infrared reflective layer IRL comprises a plurality of cholesteric liquid crystal layers CLC.

In an embodiment, the infrared reflective layer IRL may have a structure comprising a cholesteric liquid crystal. The cholesteric liquid crystal may be a chiral nematic liquid crystal having a helix structure. Optical characteristics of the cholesteric liquid crystal may be determined depending on a direction of a helix axis. For example, the cholesteric liquid crystal may selectively reflect light having a wavelength corresponding to (e.g., substantially the same as) a helix cycle of the helix structure. Hence, the wavelength band of light desired to be reflected by the infrared reflective layer IRL may be determined by adjusting the size of the helix cycle of the cholesteric liquid crystal.

In an embodiment, the cholesteric liquid crystal layer CLC may polarize incident light in one direction and transmit or reflect the incident light. For example, in an embodiment in which the helix structure of the cholesteric liquid crystal has a right-handed structure, the cholesteric liquid crystal layer CLC may reflect right-handed circularly polarized light. In an embodiment in which the helix structure of the cholesteric liquid crystal has a left-handed structure, the cholesteric liquid crystal layer CLC may reflect left-handed circularly polarized light.

In an embodiment as shown in FIG. 13, the infrared reflective layer IRL comprises a single cholesteric liquid crystal layer CLC. In an embodiment, the infrared reflective layer IRL may have a thin-film structure.

In an embodiment in which the first incident light L1 (e.g., first infrared light IR_I provided from the optical pen OP) is applied to the cholesteric liquid crystal layer CLC, the cholesteric liquid crystal layer CLC may reflect the first incident light L1 and provide first reflective light R1 that is polarized in a first direction D1. The first reflective light R1 may be second infrared light IR_R. The first reflective light R1 may be provided to the optical pen OP. In an embodiment, the cholesteric liquid crystal of the cholesteric liquid crystal layer CLC may have a left-handed helix structure or a right-handed helix structure.

In an embodiment, the infrared reflective layer IRL may comprise a first cholesteric liquid crystal layer CLC1 and a second cholesteric liquid crystal layer CLC2 (refer to FIG. 14). The first cholesteric liquid crystal layer CLC1 and the second cholesteric liquid crystal layer CLC2 may respectively comprise cholesteric liquid crystals having helix structures defined in different directions from each other. For example, the first cholesteric liquid crystal layer CLC1 may have a first cholesteric liquid crystal having a left-handed helix structure. The second cholesteric liquid crystal layer CLC2 may have a second cholesteric liquid crystal having a right-handed helix structure. However, embodiments of the present disclosure are not necessarily limited thereto.

In this embodiment, the reflectivity of the infrared reflective layer IRL may be markedly increased, so that the recognition performance of the optical pen OP can be further increased. In an embodiment in which the infrared reflective layer IRL comprises the first cholesteric liquid crystal layer CLC1 and the second cholesteric liquid crystal layer CLC2, the infrared reflective layer IRL may have a reflectivity in a range of about 70% to about 90%. However, embodiments of the present disclosure are not necessarily limited to the foregoing numerical range.

In an embodiment in which the first incident light L1 (e.g., first infrared light IR_I provided from the optical pen OP) is applied to the cholesteric liquid crystal layer CLC, the second cholesteric liquid crystal layer CLC2 may reflect the first incident light L1 and provide second reflective light R2 polarized in a second direction D2. A portion of the first incident light L1 may be polarized in the first direction D1 and applied to the first cholesteric liquid crystal layer CLC1. The first cholesteric liquid crystal layer CLC1 may reflect incident light and provide first reflective light R1 polarized in the first direction D1. The first reflective light R1 and the second reflective light R2 may be second infrared light IR_R, and may be provided to the optical pen OP.

In an embodiment, the infrared reflective layer IRL may have a thin-film structure using a cholesteric liquid crystal. In this embodiment, the infrared reflective layer IRL may be fabricated to have a thickness T intended by the user. For example, in an embodiment in which the infrared reflective layer IRL comprises a single cholesteric liquid crystal layer CLC, the thickness T of the infrared reflective layer IRL may be in a range of about 2 µm to about 5 µm. However, embodiments of the present disclosure are not necessarily limited thereto. In an embodiment in which the infrared reflective layer IRL comprises the first cholesteric liquid crystal layer CLC1 and the second cholesteric liquid crystal layer CLC2, the thickness T of the infrared reflective layer IRL may be in a range of about 4 µm to about 10 µm.

In an embodiment, since the infrared reflective layer IRL has a thin-film structure, the display device DD may be fabricated as a flexible device. For example, the display device DD comprising the infrared reflective layer IRL may be a flexible display device. For instance, the flexible display device may be at least one of a bendable display device, a curved display device, and a foldable display device.

Various embodiments of the present disclosure may provide a display device and a display system comprising an optical interface, which may have increased performance of recognizing information provided from an optical pen.

While various non-limiting embodiments have been described above, those skilled in the art will appreciate that various modifications, additions and substitutions are possible, without departing from the scope and spirit of embodiments of the present disclosure.

Therefore, embodiments disclosed in this specification are only for illustrative purposes rather than limiting the technical spirit of the present disclosure.

What is claimed is:

1. A display device comprising:
   a display layer emitting light;
   an infrared reflective layer that reflects infrared light, the infrared reflective layer is disposed on the display layer; and
   an optical pattern disposed on the infrared reflective layer, the optical pattern absorbing at least a portion of infrared light, wherein the infrared reflective layer and the optical pattern are disposed on different layers from each other.

2. The display device according to claim 1, wherein the infrared reflective layer comprises a cholesteric liquid crystal and has a thin-film structure.

3. The display device according to claim 2, wherein the infrared reflective layer comprises a first cholesteric liquid crystal layer and a second cholesteric liquid crystal that respectively comprise cholesteric liquid crystals having helix structures defined in different directions from each other.

4. The display device according to claim 1, further comprising:
   an upper layer disposed between the display layer and the infrared reflective layer,
   wherein the upper layer is a base and the infrared reflective layer is disposed on the base.

5. The display device according to claim 1, wherein the optical pattern comprises organic material absorbing at least a portion of light in a wavelength band ranging from about 750 nm to about 950 nm.

6. The display device according to claim 1, wherein the optical pattern is arranged in a dot pattern.

7. The display device according to claim 1, further comprising:
   an upper layer disposed between the display layer and the optical pattern,
   wherein the upper layer is a base and the optical pattern is disposed on the base, and
   wherein the infrared reflective layer is disposed between the upper layer and the display layer.

8. The display device according to claim 1, further comprising:
   a first base disposed between a first surface of the infrared reflective layer and the display layer; and
   a second base disposed on a second surface of the infrared reflective layer that is opposite to the first surface of the infrared reflective layer.

9. A display device comprising:
   a display layer emitting light;
   an infrared reflective layer disposed on the display layer;
   an optical pattern disposed on the infrared reflective layer, the optical pattern absorbing at least a portion of infrared light; and
   a scattering layer comprising a scatterer including at least one of a light scattering particle and a light scattering material.

10. The display device according to claim 9, wherein the scattering layer comprises an adhesive layer.

11. The display device according to claim 9, wherein the scattering layer comprises an anti-glare (AG) coating layer.

12. The display device according to claim 9, wherein the optical pattern is disposed between the scattering layer and the infrared reflective layer.

13. The display device according to claim 9, wherein the scattering layer is disposed between the infrared reflective layer and the display layer.

14. The display device according to claim 9, further comprising:
   a film layer disposed on the optical pattern; and
   an outer layer disposed on the film layer,
   wherein the film layer comprises one or more films selected from a group comprising a polyethyleneterephthalate (PET) film, a polyimide (PI) film, a low-reflective film, a polarizing film, and a transmittance controllable film, and
   wherein the scattering layer is disposed between the film layer and the outer layer.

15. The display device according to claim 9,
   wherein the scattering layer comprises a first scattering layer and a second scattering layer that are disposed on different layers from each other,
   wherein the first scattering layer is disposed between the infrared reflective layer and the display layer, and
   wherein the second scattering layer is disposed on the optical pattern.

16. A display system comprising an optical interface, the display system comprising:
   an optical pen outputting infrared light; and
   a display device obtaining information about user input based on the infrared light output from the optical pen,
   wherein the display device comprises a display layer emitting light; an infrared reflective layer disposed on the display layer and reflecting at least a portion of the infrared light output from the optical pen; and an optical pattern disposed on the infrared reflective layer and absorbing at least a portion of the infrared light output from the optical pen, wherein the infrared reflective layer and the optical pattern are disposed on different layers from each other.

17. The display system according to claim 16,
wherein the infrared light comprises information about an input operation of a user,
wherein the display device comprises a writing area having the optical pattern disposed therein.

18. The display system according to claim 16, wherein the infrared reflective layer comprises a cholesteric liquid crystal.

19. The display system according to claim 18, wherein the infrared reflective layer comprises a first cholesteric liquid crystal layer and a second cholesteric liquid crystal that respectively comprise cholesteric liquid crystals having helix structures defined in different directions from each other.

20. The display system according to claim 16, wherein the display device further comprises a scattering layer comprising a scatterer including at least one of a light scattering particle and a light scattering material.

* * * * *